(12) United States Patent
Knepper et al.

(10) Patent No.: US 9,535,464 B2
(45) Date of Patent: Jan. 3, 2017

(54) INFORMATION HANDLING SYSTEM HAVING SEPARATELY ARTICULATING TAIL PIECE

(71) Applicant: Dell Products L.P., Round Rock, TX (US)

(72) Inventors: Lawrence E. Knepper, Leander, TX (US); David M. Meyers, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 34 days.

(21) Appl. No.: 14/611,615

(22) Filed: Feb. 2, 2015

(65) Prior Publication Data

US 2016/0224071 A1    Aug. 4, 2016

(51) Int. Cl.
G06F 1/16    (2006.01)
H05K 5/00    (2006.01)
H05K 7/00    (2006.01)

(52) U.S. Cl.
CPC .......... G06F 1/1681 (2013.01); G06F 1/1616 (2013.01); G06F 1/1635 (2013.01); G06F 1/1667 (2013.01)

(58) Field of Classification Search
CPC ............................. G06F 1/1664; G06F 1/1667
USPC .......................... 361/679.11, 679.12, 679.26, 679.27, 361/679.28
See application file for complete search history.

(56) References Cited

U.S. PATENT DOCUMENTS

| | | | | |
|---|---|---|---|---|
| 5,375,076 A * | 12/1994 | Goodrich | ............. | G06F 1/1626 361/679.17 |
| 6,301,098 B1 * | 10/2001 | Kim | .................... | G06F 1/1615 190/100 |
| 6,612,668 B2 * | 9/2003 | Doan | .................... | G06F 1/1616 16/303 |
| 7,136,282 B1 * | 11/2006 | Rebeske | ............... | G06F 1/1616 345/1.1 |
| 7,948,753 B2 * | 5/2011 | Wang | .................... | G06F 1/1616 220/318 |
| 8,264,599 B2 * | 9/2012 | Liu | ...................... | H04N 5/2251 348/333.1 |
| 8,284,549 B2 * | 10/2012 | Liu | ....................... | G06F 1/1616 16/334 |
| 8,792,947 B2 * | 7/2014 | Riddiford | ............ | H04M 1/022 455/575.3 |
| 8,941,979 B2 * | 1/2015 | Griffin | .................. | G06F 1/1662 361/679.01 |
| 2004/0264118 A1 * | 12/2004 | Karidis | ................. | G06F 1/1616 361/679.55 |

(Continued)

OTHER PUBLICATIONS

H. McCracken, Clamshell! The Story of the Greatest Computing Form Factor of All Time, Jul. 16, 2012 http://techland.time.com/2012/07/16/clamshell-the-history-of-the-greatest-computing-form-factor-of-all-time/.

*Primary Examiner* — Anthony Haughton

(74) *Attorney, Agent, or Firm* — Terrile, Cannatti, Chambers & Holland, LLP; Stephen A. Terrile

(57) ABSTRACT

An information handling system housing is provided with a base portion, a head portion and a chin portion all coupled via a hinge such that the chin portion are separately articulable. By providing the hinge so that the chin portion can articulate separately from the rest of the head portion, the chin portion can articulate towards the rear of the system. This articulation reduces the table height of the hinge pivot point, and therefore reduces the slope of the base and keyboard assembly.

9 Claims, 3 Drawing Sheets

(56) References Cited

U.S. PATENT DOCUMENTS

2011/0002096 A1\* 1/2011 Thorson ................ G06F 1/1618
361/679.04
2014/0160654 A1\* 6/2014 Yoo ....................... G06F 1/1637
361/679.12

\* cited by examiner

INFORMATION HANDLING SYSTEM HAVING SEPARATELY ARTICULATING TAIL PIECE

BACKGROUND OF THE INVENTION

1. Field of the Invention

The present invention relates to information handling systems. More specifically, embodiments of the invention relate to portable information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide portable information handling systems with a clamshell housing design (i.e., a housing in which two parts are attached by a hinge and that open and close like a clamshell).

To achieve a desired thin clamshell design, it is desirable to move much of the information handling system electronics out from within the critical housing stacks. For example, in certain designs, the critical stack for the base of the clamshell housing includes only a keyboard and a battery as well as the necessary housing base. The critical stack for the head assembly includes only a display assembly (e.g., a liquid crystal display (LCD) assembly) as well as the necessary housing. One known possibility for addressing this issue is to move the hinge up from the bottom of the head (hinge-up) assembly and have the base fold up into the head in closed mode. (FIG. 1, labeled Prior Art, shows an example of such an assembly.) The total system thickness is just the minimum head stack with LCD, plus the minimum base stack with keyboard and battery. The main electronics assembly (motherboard, etc.) are then located within a portion of the head that is below the hinge (referred to as the "chin" here). However, such a design can result in having to raise the hinge pivot point high enough that the slope of the base in open mode is too great. (See e.g., FIG. 1, labeled Prior Art.)

SUMMARY OF THE INVENTION

In accordance with the present invention, an information handling system housing is provided with a base portion, a head portion and a chin portion all coupled via a hinge such that the chin portion are separately articulable. By providing the hinge so that the chin portion can articulate separately from the rest of the head portion, the chin portion can articulate towards the rear of the system. This articulation reduces the table height of the hinge pivot point, and therefore reduces the slope of the base and keyboard assembly. In certain embodiments, the chin portion can be manually adjusted by the user for their preferred typing surface slope. In other embodiments, the hinge comprises a geared hinge which causes the chin to articulate towards the back automatically as the keyboard base is rotated into the open position.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
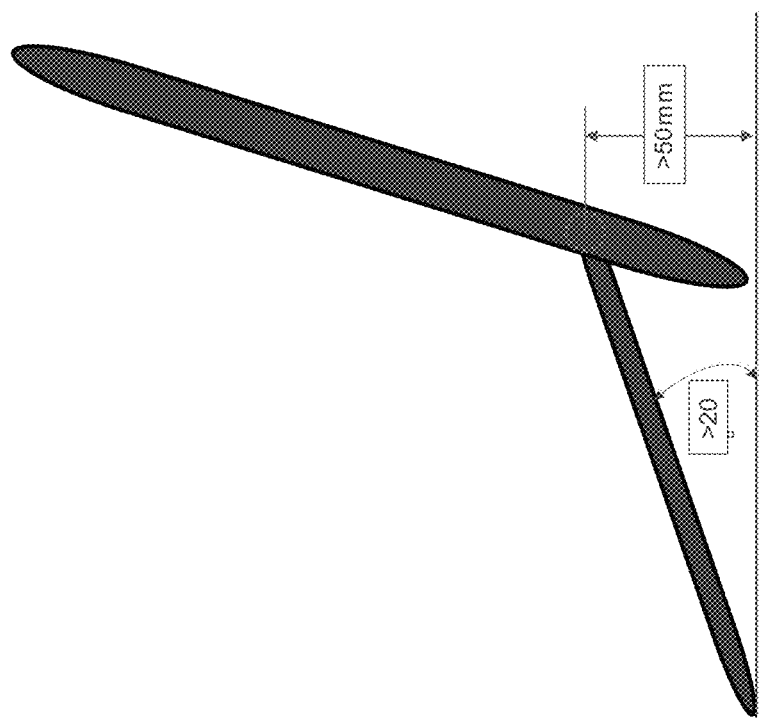
FIG. 1, labeled Prior Art, shows a side view of an example information handling system housing with a clamshell design.
Figure 2:
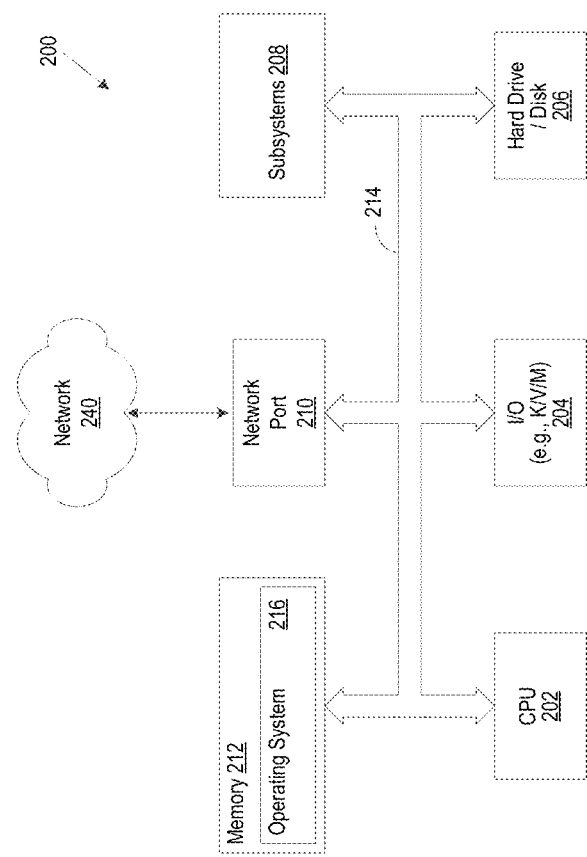
FIG. 2 shows a general illustration of components of an information handling system as implemented in the system and method of the present invention.

FIG. 2 is a generalized illustration of an information handling system 200 that implements the system and method of the present invention. The information handling system 200 includes a processor (e.g., central processor unit or "CPU") 202, input/output (I/O) devices 204, such as a display, a keyboard, a mouse, and associated controllers, a hard drive or disk storage 206, and various other subsystems 208. In various embodiments, the information handling system 200 also includes network port 210 operable to connect to a network 240, which is likewise accessible by a service provider server 242. The information handling system 200 likewise includes system memory 212, which is interconnected to the foregoing via one or more buses 214. System memory 212 further comprises operating system (OS) 216.

In accordance with the present invention, the components of the information handling system 200 are housed within a modified clamshell design housing. Specifically, in certain embodiments, the keyboard (as well as optionally other I/O devices such as a trackpad) is housed within a base portion of the clamshell housing. Additionally, in certain embodiments, the base portion of the clamshell housing also houses a battery assembly for the information handling system 200. Additionally, the display is housed within a head portion of the clamshell housing. Some or all of the remaining components are housed within a chin portion of the clamshell housing.

Figures 3, 4:
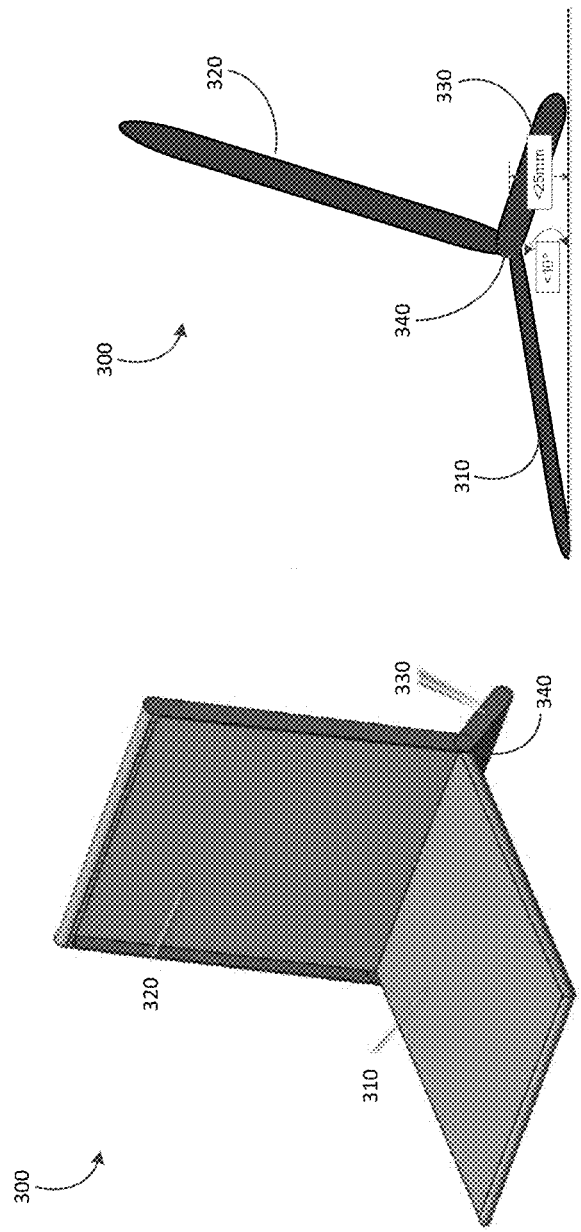
FIG. 3 shows a perspective view of an information handling system clamshell housing are shown.
FIG. 4 shows a side view of an information handling system clamshell housing.

Referring to FIG. 3 a perspective view of an information handling system clamshell housing 300 is shown. More specifically, the information handling system housing 300 comprises a base portion 310, a head portion 320 and a chin portion 330 all coupled via a hinge 340 such that base portion 310, the head portion 320 and the chin portion 330 are separately articulable. The width of the chin portion 330 is configured to be substantially equal (i.e., =/−5%) to the width of the base and head portions when closed.

By providing the hinge 340 so that the chin portion 330 can articulate separately from the rest of the head portion 320, the chin portion 330 can articulate towards the rear of the system. This articulation reduces the table height of the hinge pivot point 310, and therefore reduces the slope of the base and keyboard assembly. In certain embodiments, this table height is less than 25 mm and the slope of the base and keyboard assembly is less than 10 degrees. In certain embodiments, the chin portion is manually adjusted by the user for their preferred typing surface slope. In other embodiments, the hinge comprises a geared hinge (not shown) which causes the chin portion 330 to articulate towards the back automatically as the keyboard base is rotated into the open position.

Referring to FIG. 4, a side view of an information handling system clamshell housing 300 is shown. With the information handling system clamshell housing 300, the base portion 310 houses a keyboard, a pointing device (e.g., a trackpad) and a battery. Additionally, the head portion 320 houses a display assembly (e.g., an LCD assembly). Some or all of the remaining components are housed within a chin portion of the clamshell housing 330. In certain embodiments, these components are included with a circuit board assembly which also includes I/O connections such as a universal serial bus (USB) connection. Also, in certain embodiments, the I/O connections include a power connection via which external power is provided to the battery.

Such an information handling system clamshell housing provides a significantly more comfortable typing surface. Additionally, such an information handling system clamshell housing provides increased stability. Such increased stability is especially advantageous when the information handling system includes a touch sensitive display device such that a user applies a rearward force when actuating the display device. Having a chin portion which extends to the back of the information handling system offsets this force.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system."

Furthermore, the present invention may take the form of a computer program product on a computer-usable storage medium having computer-usable program code embodied in the medium.

Consequently, the invention is intended to be limited only by the spirit and scope of the appended claims, giving full cognizance to equivalents in all respects.

What is claimed is:

1. An information handling system housing, comprising:
a base portion
a head portion, and,
a chin portion, the base portion, head portion and chin portion being coupled to a hinge, the base portion head portion and chin portion being separately articulable about the hinge such that the chin portion can articulate towards the rear of the system and providing an information handling system housing having a modified clamshell design; and wherein
a motherboard of the information handling system is located within the chin portion.

2. The information handling system housing of claim 1, wherein:
the chin being separately articulable provides a table height of a hinge pivot point of less than 25 mm and a slope of the base portion of less than 10 degrees.

3. The information handling system of claim 1, wherein:
the base portion comprises a keyboard; and,
the chin portion is manually adjustable to enable provision of a preferred typing surface slope.

4. The method of claim 1, wherein:
the hinge comprises a geared hinge, the geared hinge causing the chin to articulate towards a back of the information handling system housing as the base portion is rotated into an open position.

5. A system comprising:
a processor;
a data bus coupled to the processor via a motherboard; and
a system housing, the system housing comprising:
a base portion,
a head portion, and,
a chin portion, the chin portion housing the processor, the motherboard and at least a portion of the data bus, the base portion, head portion and chin portion being coupled to a hinge, the base portion head portion and chin portion being separately articulable about the hinge such that the chin portion can articulate towards the rear of the system and providing an information handling system housing having a modified clamshell design.

6. The system of claim 5, wherein:
the chin being separately articulable provides a table height of a hinge pivot point of less than 25 mm and provides a slope of the base portion of less than 10 degrees.

7. The system of claim 5, wherein:
the base portion comprises a keyboard; and,
the chin portion is manually adjustable to enable provision of a preferred typing surface slope.

8. The system of claim 5, wherein:
the hinge comprises a geared hinge, the geared hinge causing the chin to articulate towards a back of the information handling system housing as the base portion is rotated into an open position.

9. The system of claim 5, wherein:
the base portion houses a keyboard and a battery; and,
the head portion houses a display.

* * * * *